Patented May 28, 1929.

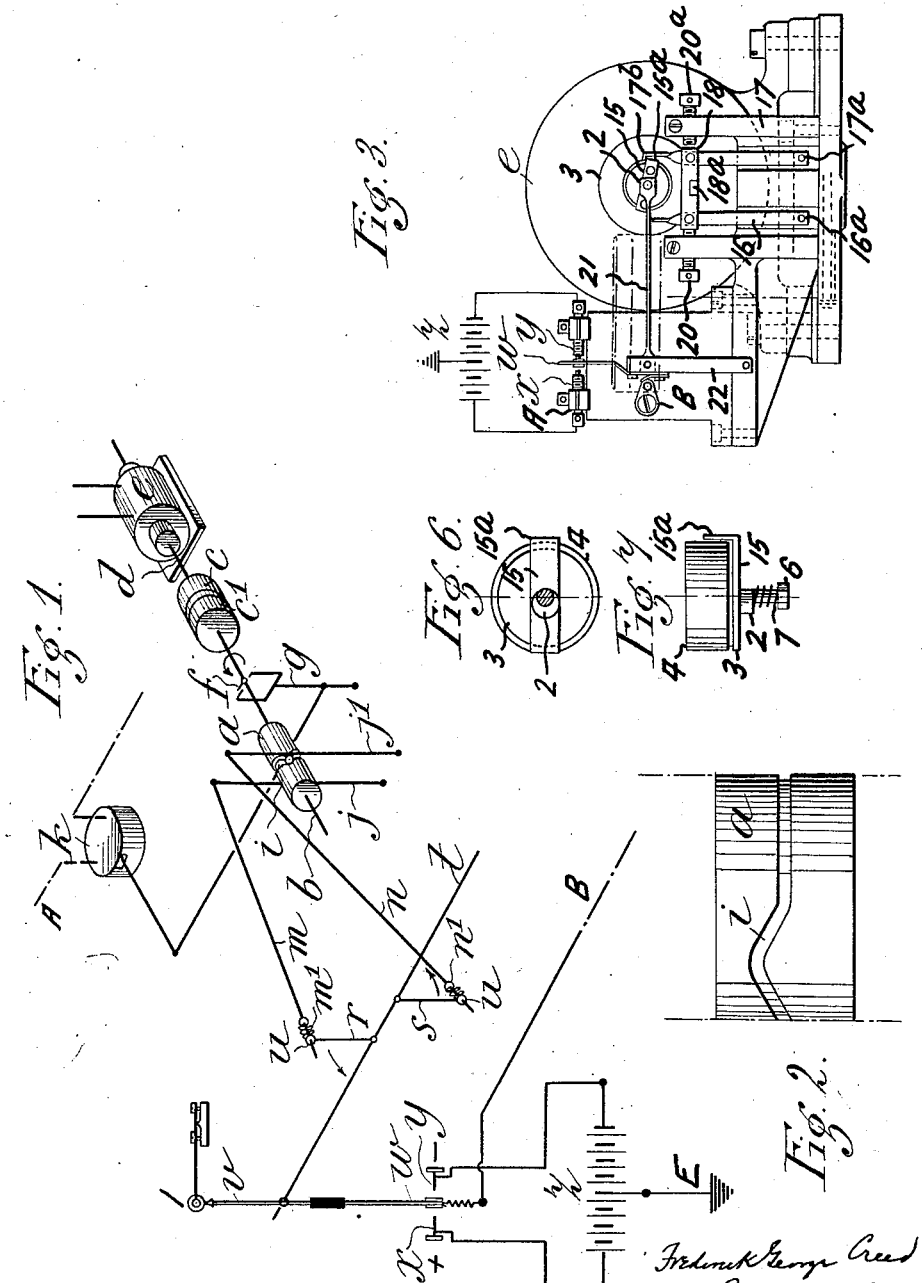

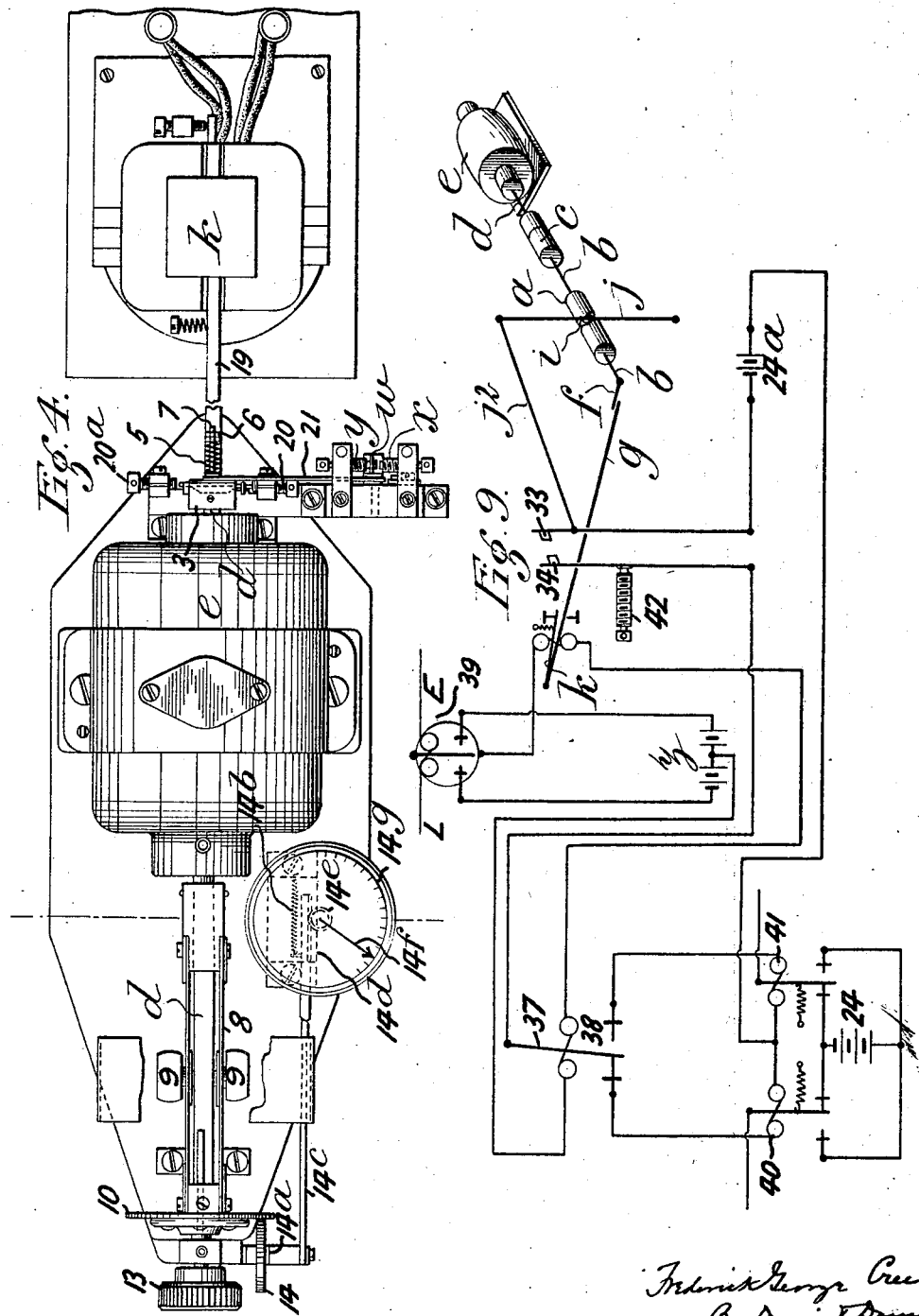

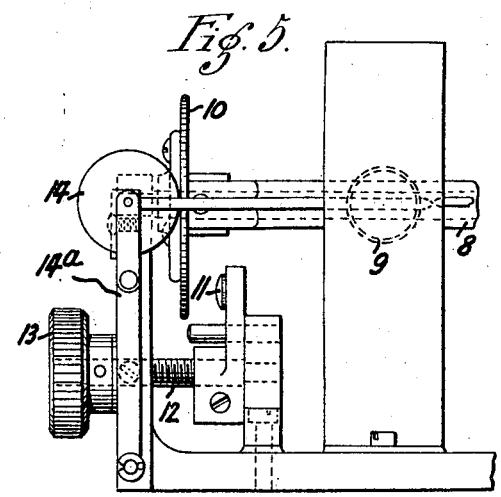
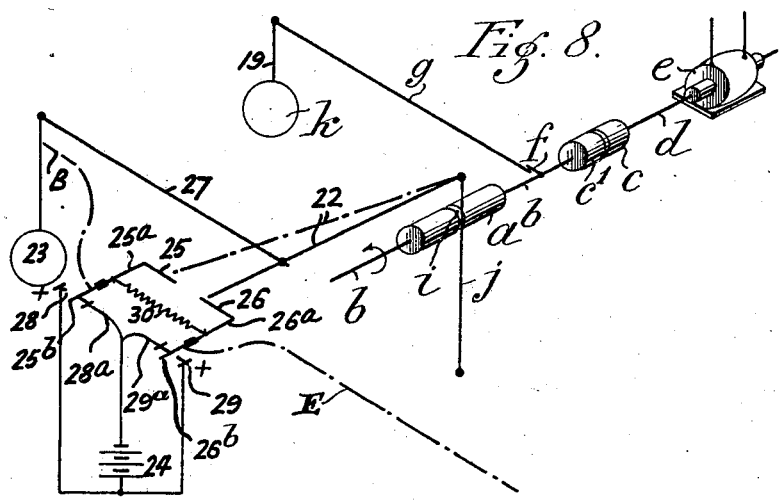
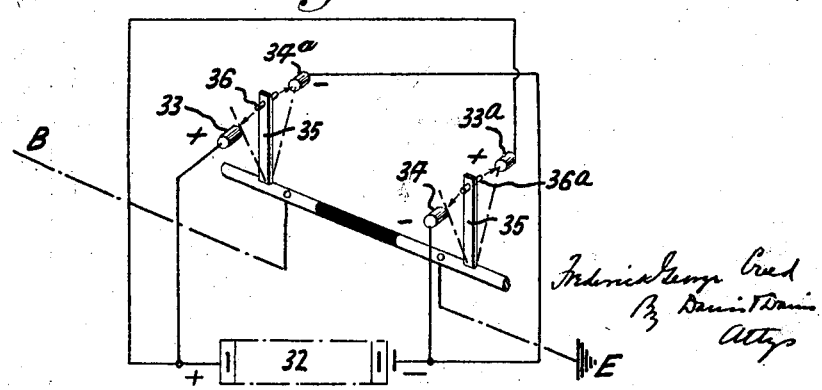

1,714,901

UNITED STATES PATENT OFFICE.

FREDERICK GEORGE CREED, OF CROYDON, ENGLAND, ASSIGNOR TO CREED AND COMPANY LIMITED, A COMPANY OF GREAT BRITAIN.

TELEGRAPHIC APPARATUS FOR THE AUTOMATIC RECEPTION AND RETRANSMISSION OF ELECTRIC SIGNALS.

Application filed November 8, 1924, Serial No. 748,662, and in Great Britain November 29, 1923.

This invention has reference to telegraphic apparatus for the automatic reception and re-transmission of electric signals. In such apparatus, commonly called a repeater, the electric signals transmitted over one line are usually received by an electric relay which acts to close a circuit whereby they are directly repeated over a second line. With such a repeater, when the signals are received in a distorted condition, the repeated signals are also distorted and the distortion is apt to increase with each successive repetition.

Now the present invention has for its object to provide telegraphic receiving and repeating apparatus whereby received signals, even of minimum length, can be quickly and effectively retransmitted at approximately full length and power. It has also for its object to enable the signals received from a transmitter either directly, or over a land, cable, wireless or other telegraph circuit to be simultaneously and accurately repeated by a single relay arrangement over a number of other lines. It also has for its object to enable the split battery commonly used for transmitting positive and negative signals, to be replaced by a single battery of half the voltage of the replaced battery.

For enabling the first mentioned object to be attained, telegraphic receiving and repeating apparatus according to the present invention, comprises, in addition to the electrical relay (hereinafter called the line relay) operated by the signals transmitted over a telegraph line, or by one or more supplementary electrical relays (hereinafter called the supplementary relay or relays) operated or controlled by the line relay, a mechanically operated relay that is controlled by the line relay, or supplementary relay or relays, and a circuit making and breaking device or circuit changing device that is operated or controlled by the mechanical relay and is adapted to retransmit over another telegraph line or lines, positive and negative signals corresponding to those received over the first line but of full strength and approximately full duration, whatever may be the strength and duration of the signals received over the first line by the line relay, provided they be such as will cause such relay to operate.

In such an arrangement, the mechanically operated relay (hereinafter called for brevity the mechanical relay) may conveniently comprise a rotary cam device, means under the control of the line relay, or line and supplementary relays, for normally holding such cam device stationary, an electric or other motor connected to the cam device through a yielding or friction device and a circuit making and breaking device or circuit changing device (hereinafter called for brevity the circuit controller) adapted to be operated intermittently in opposite directions from or under the control of the rotary cam device and thereby to place the line over which received signals are to be repeated, in connection with the positive or negative pole of an electric battery. The arrangement is such that on the receipt of say a positive signal, the line relay, or line and supplementary relays, will act to release the cam device and permit the latter to be rotated by the clutch device from the motor to a definite extent and operate the circuit controller in one direction and cause a full strength positive signal to be transmitted through the second line, the rotary motion of the cam device being then arrested. Upon the receipt of the next or negative signal, the cam device will be again released and rotated to the same definite extent, and the circuit controller be thereby moved in the opposite direction to cause a full strength negative signal to be transmitted through the second line, the operation being repeated each time a signal is received.

Apparatus to operate in the manner described can be variously constructed.

In the accompanying illustrative drawings, Fig. 1 shows, diagrammatically, one construction of telegraphic receiving and repeating apparatus according to the invention. Fig. 2 is a developed view of a cam used in such apparatus. Fig. 3 shows in end elevation and Fig. 4 in plan, a constructional arrangement of a modified construction of the apparatus shown in Fig. 1. Fig. 5 is a side elevation of part of the apparatus shown in Figs. 3 and 4. Figs. 6 and 7 show respectively in end elevation and plan, part of the apparatus shown in Figs. 3 and 4 but to a larger scale. Fig. 8 shows, diagrammatically, another construction of telegraphic receiving and repeating apparatus. Figs. 9 and 10 show, diagrammatically, modified circuit controlling arrangements.

In the arrangement shown in Fig. 1, which is suitable for repeating signals according to the Morse land line or other code in which positive and negative signals alternately succeed each other, the rotary cam device comprises a cam cylinder $a$ fixed upon a spindle $b$ and arranged, when released, to be rotated through a friction clutch $c$ $c^1$ from a driving shaft $d$ driven from an electric or other motor $e$ at a speed approximately synchronous with the rate at which the incoming signals arrive. The cam cylinder is released and arrested by an escapement device, one member $f$ of which is connected to the cam cylinder and the other member $g$ of which is adapted to be operated by a polarized line relay $k$, either directly, or indirectly through a supplementary relay, the arrangement being such that the cam cylinder can be rotated through half a revolution each time it is released. A is an incoming line wire connected to or controlling the relay $k$. The cylinder $a$ is formed with a cam groove $i$ into which extend, at diametrically opposite portions thereof, rollers carried by two levers $j$ and $j^1$. The cam groove is so shaped, (see Fig. 2) that when the cam cylinder rotates through one half revolution, it moves one of the levers, say $j$, first forward and then backward to its original position whilst the other lever $j^1$ remains at rest. When the cam cylinder makes its next half revolution, it moves the second lever $j^1$ first forward and then backward to its original position, the first lever $j$ remaining at rest. The two levers $j$ and $j^1$ are connected to two links $m$ and $n$ respectively so connected to two oppositely extending arms $r$ and $s$ respectively on a rock shaft $t$ that when one lever, say $j$, moves forward, it turns the rock shaft in one direction, and when the other lever $j^1$ moves forward it turns the rock shaft in the opposite direction. The backward movements of the levers and links are inoperative on the arms $r$ and $s$ and shaft $t$. For this purpose, those ends of the links $m$ and $n$ remote from the levers $j$ and $j^1$ may, as shown, move freely through eyes $u$ on the free ends of the arms $r$ and $s$ and be provided with collars $m^1$ and $n^1$ arranged to act against the eyes only on forward movement of the levers and links. To the rock shaft $t$ is fixed a two arm lever $v$ for operating the circuit controller. This lever is connected to but insulated from a movable contact $w$ connected to the second or outgoing line B, and arranged to work between two stationary but adjustable contacts $x$ and $y$ connected to the positive and negative poles of a split electric battery $z$, the middle point of which is earthed at E. The free end of the other arm of the said lever $v$ is adapted to be acted upon by a spring actuated jockey roller 1, adapted, when the lever is moved past its mid position, to act thereon and ensure that it shall complete its movement quickly and cause the movable contact $w$ carried thereby to bear firmly against the stationary contact $x$ or $y$ towards which it was moved.

In the construction shown in Figs. 3 to 7 inclusive, the rotary cam cylinder $a$ with cam groove $i$ of Fig. 1, is replaced by an eccentric 2 fixed to a plate 3 held in frictional contact with the front end of a cylinder 4 by a spring 5 bearing against it and a nut 6 on the end of a rod 7 extending through the eccentric 2 and fixed to the cylinder. The cylinder is fixed to the driving shaft $d$ of an electric motor $e$ provided with spring blades 8 carrying the centrifugal weights 9 of a speed governor. 10 is a disc sliding on shaft $d$ and connected to the spring blades 8. 11 is an adjustable friction stop against which the disc 10 is caused to bear when the centrifugal force acting on the weight 9 causes the springs 8 to foreshorten. 12 is a screw on which the stop 11 is mounted so that its endways position can be adjusted by turning knob 13 fixed to the screw 12. 14 is a disc that is carried by a pivoted arm $14^a$ and is adapted to be pressed against the disc 10 by the action of a light spring $14^b$ through a link $14^c$ that is cut with a rack $14^d$ on one end to engage with a pinion $14^e$ that carries a pointer $14^f$ to indicate on a scale $14^g$ the speed at which the machine is running. The escapement device in this arrangement comprises a rotary plate 15, carrying the eccentric 2 and provided at one end with a longitudinally arranged tooth or extension $15^a$, and two levers 16 and 17 pivoted at $16^a$ and $17^a$ respectively. One of these levers, namely 17, is provided at its upper end with an inwardly extending tooth or detent $17^b$ adapted to engage the upper side of the tooth $15^a$ on the plate 15, at the end of one half revolution of the said plate, whilst the upper end of the lever 16 is adapted to form an abutment for the said tooth at the end of the next half revolution of the said plate. The two levers 16 and 17 are connected together by a bar 18 formed with a notch $18^a$ into which extends the armature lever 19 of a relay $k$ for moving the arms 16 and 17 to right or left according as say positive or negative signals are being received. 20 and $20^a$ are adjustable stops to regulate the positions of the arms 16 and 17 respectively. On the eccentric 2 is journalled one end of a rod 21 the other end of which is connected to a pivoted arm 22 of insulating material carrying a movable contact $w$ arranged to work between fixed but adjustable contacts $x$ and $y$ connected to the positive and negative poles of a local split earthed battery $z$, the movable contact $w$ being connected to the second line B.

The relay $k$ in each of the arrangements described will usually be a polarized power relay controlled by a polarized sensitive relay in the incoming line, so that with an escapement acting to hold and release the cam cylinder $a$ (Figs. 1 and 2), or the friction plate 3 (Figs. 3 to 7), at each half revolution of the driving shaft $d$, the arrangements can be used for receiving and repeating signals according to the Morse land line code.

With arrangements such as hereinbefore described, the movable contact of the circuit controller will have a large positive dead beat movement and a quick transit line, and received signals, even of minimum length and distorted, can effectually be retransmitted as approximately full length strong signals without distortion, or with a minimum of distortion.

When it is desired to repeat signals transmitted according to the Morse cable code, the pivoted levers $j$, $j^1$ (Fig. 1) may, as shown in Fig. 8, be replaced by a single lever $j$ actuated by the cam cylinder $a$ which is arranged to be driven from the motor shaft $d$, running at approximately synchronous speed, through a friction clutch $c$ and $c^1$, as in the arrangement shown in Fig. 1, but is controlled by an escapement comprising a tooth $f$ connected to one member $c^1$ of the friction clutch and a single detent $g$ that can be moved into and out of the path of the tooth by means such as the armature lever 19 of a non-polarized relay $k$ subject to the action of the line signals, so that the cam cylinder $a$ is adapted to make one complete rotation for each dot or dash signal received and to be held stationary during spaces. The pivoted lever $j$ during each rotation of the cam cylinder $a$ is arranged to actuate, either directly, as shown, or indirectly, a contact selecting device 22 that is under the control of a polarized relay 23 subject to the action of the line signals, and is adapted to actuate, according as a dot or dash signal is received, one or other of two contact making devices associated with a battery 24. The contacts may be carried by bell crank levers 25, 25$^a$ and 26, and 26$^a$, one arm 25 or 26 of each of which is arranged to be actuated by the contact selector device 22 from or under the control of the cam cylinder $a$ and under the control, through a link 27, of the polarized relay 23. The other arm 25$^a$ or 26$^a$ of each lever, carries an insulated contact 25$^b$ or 26$^b$ arranged to work between a pair of stationary but adjustable contacts 28, 28$^a$ or 29, 29$^a$. Contacts 28$^a$ and 29$^a$ are connected to one pole, say the negative pole, of a battery 24, and the other two contacts 28 and 29 are connected respectively to the other or positive pole of the battery. The movable contact 25$^b$ is connected to the second line B, and the movable contact 26$^b$ to earth E and both of them are normally held by spring means 30 against the two stationary contacts 28$^a$ and 29$^a$ connected to the negative pole of the battery. Lever 25, 25$^a$ is arranged, when actuated, to connect the second line B over which signals are to be repeated, to the positive pole of the battery, the second lever 26, 26$^a$ being then stationary and acting to complete the battery circuit through earth. The second lever 26, 26$^a$ when actuated, serves to connect the positive pole of the battery to earth, the lever 25—25$^a$ being then stationary and acting to complete the battery circuit through the second line B. The relay $k$ may be a power relay under the control of a non-polarized relay itself controlled by a neutral type line relay. The cam cylinder $a$ under the action of the escapement and relay makes one revolution on the receipt of each dot or dash signal, after the manner in which the cam cylinder described in the tape punching cable receiver described in the specification of my application for Letters Patent Serial No. 646,100 is allowed to make one revolution for each signal received. It will be seen that with the arrangement described, when a succession of say positive signals are received, as is possible when working with Morse cable code, the lever 25, 25$^a$ will be operated successively by the selector device 22, to re-transmit a succession of positive signals to the second line B, and when a succession of negative signals are received, the lever 26, 26$^a$ will be operated successively by the selector device 22 to re-transmit a succession of negative signals to the second line.

The contact selector device 22 may, as shown, conveniently be in the form of an arm pivoted to the lever $j$ and adapted to be moved alternately opposite the two arms 25 and 26 of the bell crank levers 25, 25$^a$ and 26, 26$^a$ by the link 27 operated from the relay 23, which may be a power relay under the control of a nonpolarized relay that is itself under the control of a neutral type line relay, after the manner in which the punch selector described in the specification of my said Application for Letters Patent Serial No. 646,100 is operated. The motor spindle $d$ for driving the cam cylinder $a$ is arranged to be driven synchronously with the speed of the incoming signals.

Instead of causing the pivoted lever $j$ to actuate, or to control the actuation of, one or other of two contacts as just described, it may, as shown, in Fig. 9, be arranged through a link $j^2$ always to close a single pair of contacts 33 and 34 in a local circuit which comprises a battery 24$^a$ and the tongue 37 of a polarized relay 38 which is under the control of the neutral type line relay 39, the tongue continuing the circuit through the coils of one or other of the usual cable signalling relays 40 and 41, thus actuating one or other of the relays as dot or dash signals are being received and interpolating the signals when they exceed dot and dash length.

The cam groove $i$, in the said cam cylinder $a$ may be so formed as to cause the longest possible contact time for each revolution and supplementary means such as a set screw 42, may be provided for adjusting contact 34 relatively to contact 33 for regulating the proportion of "signalling" to "earthing".

In arrangements such as first herein described for use with land lines, the rock spindle or pole changer can be provided with several movable contacts insulated from each other and arranged simultaneously to close or change electric circuits through several lines through which the received signals are to be repeated, thereby avoiding the use of a number of separate circuit controllers or relays for this purpose. For a like purpose, in the case of apparatus for dealing with Morse cable code signals, a number of pairs of movable contacts associated with stationary contacts associated with separate lines and with earth, may be provided and the contact selector be provided with means, as for instance a transverse member, for operating one or other of the two sets of movable contacts.

To enable the usual split battery to be dispensed with, there may be employed in arrangements such as described, and as shown in Fig. 10, a battery 32 the positive and negative poles of which are connected respectively to two stationary contacts 33, 33ᵃ and 34, 34ᵃ, and the contact carrying levers 35 are provided with two insulated movable contacts 36 and 36ᵃ, one of which 36 is connected to the line wire B over which signals are to be transmitted and arranged to move between or over and to co-act alternately with the stationary contacts 33 or 34ᵃ of one pair connected respectively to the positive and negative poles of the battery, whilst the other movable contact 36ᵃ, is connected to earth and arranged simultaneously to co-act alternately with the stationary contact 34 or 33ᵃ of the second pair connected to the negative and positive poles respectively of the battery, after the manner of the pole changer used in a Wheatstone transmitter.

As will be obvious, the details of construction of apparatus of the kind herein described can be variously modified without departing from the essential features thereof. For instance, instead of using as the rotary cam device, a cylinder a formed with a cam groove i, for operating a pivoted lever, or levers, or one or more eccentrics 2 with rod or rods, as hereinbefore described, one or more face cams may be used, the parts with which such face cam or cams are used being modified to suit requirements.

What I claim is:—

1. Telegraphic receiving and repeating apparatus, comprising a relay arrangement responsive to signals to be received over one telegraph line, a mechanical relay comprising a rotary member controlled by said relay arrangement, means for driving said rotary member, a yielding connection between said rotary member and its driving means and a circuit controller governed by said mechanical relay and adapted to retransmit over a second telegraph line, positive and negative signals corresponding to those received over the first line but of full strength and approximately full duration, whatever may be the strength and duration of the received signals provided they be of such strength as will cause operation of said relay arrangement.

2. Telegraphic receiving and repeating apparatus comprising a relay arrangement responsive to the signals to be received, a rotary member, driving means therefor, a yielding device between said rotary member and its driving means, escapement means acting normally to hold said rotary member stationary, said escapement means being under the control of said relay arrangement and adapted to release said rotary member when actuated by said relay arrangement, a source of electric current, and a circuit controller adapted to be operated intermittently upon intermittent release of said rotary member upon receipt of successive signals and to place a second line, over which signals corresponding in sign to the received signals are to be repeated, in connection with the positive and negative poles of the source of electric current, said circuit controller acting to transmit positive and negative signals in full strength and approximately full duration to the second line.

3. Telegraphic receiving and repeating apparatus comprising a relay arrangement responsive to received signals, a rotary member, driving means therefor, escapement means acting normally to hold said rotary member stationary, said escapement means being under the control of said relay arrangement and adapted to release said rotary member when actuated by said relay arrangement, a source of electric current, a circuit controller comprising a movable contact arranged to be actuated from said rotary member when the same is released and to cause a signal corresponding in sign to the one to which the relay arrangement responded to be transmitted from said source of current to a second line.

4. Telegraphic receiving and repeating apparatus comprising a relay arrangement responsive to received signals, a rotary member, driving means therefor, yielding means between said rotary member and driving means, escapement means acting normally to hold said rotary member stationary, said escapement means being under the control of said relay arrangement and adapted to release said rotary member when actuated by said relay arrangement, a source of electric current, stationary positive and negative contacts connected to the poles of said source of current, a movable contact mounted to move between said stationary contacts and connect one or other of them to a second line over which signals corresponding in sign to received signals, are to be repeated, means actuated from said rotary member adapted to move said movable contacts against one or other of said positive and negative contacts in accordance with the signal received and means for causing the movable contact to move quickly from a mid position to and bear firmly against one or other of said contacts.

5. Telegraphic receiving and repeating apparatus comprising a relay responsive to received signals, rotary driving means, a rotary member yieldingly driven from said driving means, escapement means acting normally to hold said rotary member stationary, a lever actuated by the relay and adapted to oscillate said escapement means and release said rotary member in an intermittent manner and permit it to be rotated by said rotary member, a source of electric current, stationary positive and negative contacts connected to the poles of said source of current, a movable contact arranged to oscillate between said stationary contacts, connecting means between said rotary member and movable contact and spring means for causing said movable contact, when moved past its mid position, to move quickly towards and bear against one or other of said stationary contacts.

6. Telegraphic receiving and repeating apparatus comprising relay mechanism responsive to received signals, a rotary cam device, driving means therefor, a yielding connection between said cam device and driving means, escapement means acting normally to hold said cam device stationary, means under the control of said relay mechanism for causing said escapement means to release said cam device in an intermittent manner according to the signals received, a source of electric current and circuit controlling means operated from said cam device and adapted to transmit signals from said source of electric current to a second line.

7. Telegraphic receiving and repeating apparatus comprising relay mechanism responsive to received signals, a rotary cam device, driving means therefor, a yielding connection between said cam device and driving means, escapement means acting normally to hold said cam device stationary, means under the control of said relay mechanism for causing said escapement means to release said cam device in an intermittent manner according to the signals received, a source of electric current and a plurality of circuit controlling means operated simultaneously from said cam device and adapted to transmit from said source of currents, signals corresponding to received signals, to a number of separate lines.

8. Telegraphic receiving and repeating apparatus comprising a relay arrangement embodying a non-polarized relay and a polarized relay, responsive to received signals, a rotary cam device, driving means therefor, a yielding connection between said cam device and driving means, escapement means acting normally to hold cam device stationary, means under the control of the non-polarized relay for causing said escapement device to release said cam device each time a signal is received, a source of electric current, circuit controlling means, means arranged to be actuated from said cam device for operating said circuit controlling means when said cam device is released, said operating means being also under the control of said polarized relay whereby the nature of the signals transmitted by the circuit controlling means to a second line is made to correspond to the sign of the received signals.

9. A device of the character described comprising in combination, receiving apparatus adapted to receive a signal comprising impulses in definite timed sequence, a motor adapted to run slightly in excess of synchronism with said signal, a timing element, means responsive to received impulses for causing said motor to operate said timing element a predetermined period equal to the period of an impulse and for stopping said timing element in predetermined position after the termination of the received impulse, and means for delaying the stopping of said timing element until the expiration of said predetermined period after the stoppage of a received impulse.

10. A device of the character described comprising, in combination, a receiving means independently responsive to positive and negative signals, transmitting circuits for transmitting positive and negative signals, means operated by the receiving means for selecting the transmitting circuit corresponding to the incoming signal, means adapted to move synchronously through a single impulse interval, means operated by the incoming impulse for starting the synchronous means, and means associated with said synchronous means for starting and stopping the transmission of a signal impulse through the selected circuit.

11. A device of the character described comprising, in combination, a receiving means responsive to positive, negative and zero impulses, circuits for independently transmitting positive and negative impulses, means connected with said receiving means for selecting the positive and negative transmitting circuits only on receipt of positive and negative impulses, a timing mechanism, means associated with said timing mechanism for starting and stopping the transmission of a signal through the selected circuit.

12. A device of the character described comprising, in combination, a receiving means responsive to positive, negative and zero impulses, circuits for independently transmitting positive and negative impulses, means connected with said receiving means for selecting the positive and negative transmitting circuits only on receipt of positive and negative impulses, a timing mechanism, means for starting said timing mechanism operated by an incoming impulse, and means associated with said timing mechanism for starting and stopping the transmission of a signal through the selected circuit.

13. A device of the character described comprising, in combination a receiving means responsive to positive, negative and zero impulses, circuits for independently transmitting positive and negative impulses, means connected with said receiving means for selecting the positive and negative transmitting circuits only on receipt of positive and negative impulses, a timing mechanism, means associated with said timing mechanism for starting and stopping the transmission of a signal through the selected circuit, and means to restore both transmitting means in position to be again selected before the commencement of the next impulse interval.

14. A device of the character described comprising, in combination, a receiving means, transmitting means associated with said receiving means to transmit signals corresponding to the received signals, timing mechanism, means connected with the timing mechanism for starting and stopping the transmission by said transmitting means and means for correcting the synchronism of said timing means at the close of each impulse period.

15. A device of the character described comprising in combination, receiving means, circuits adapted to transmit positive or negative impulses, selecting means for selecting the transmitting means corresponding to the polarity of the incoming signal, said selecting means being at all times responsive to the polarity of the incoming signal.

16. A device of the character described, comprising, in combination, receiving means responsive independently to positive and negative impulses, circuits for transmitting positive and negative impulses over an outgoing line, means responsive to the receiving means for selecting the transmitting circuit corresponding to the received impulse, timing mechanism, and means operated by the timing mechanism for completing the transmitting circuit and for opening said circuit.

17. A device of the character described, comprising, in combination, receiving means responsive independently to positive and negative impulses, circuits for transmitting positive and negative impulses over an outgoing line, means responsive to the receiving means for selecting the transmitting circuit corresponding to the received impulse, timing mechanism, means operated by the timing mechanism for completing the transmitting circuit and for opening said circuit, said selecting means being adapted to restore both of said transmitting circuits in position to be selected in time for the next signal impulse.

18. A device of the character described, comprising, in combination a timing mechanism, means for starting said timing mechanism at the commencement of each signal impulse, means responsive at all times to the instantaneous signal polarity for selecting the signal to be transmitted, transmitting means, means for starting of the signal at a predetermined time after the beginning of the signal impulse in accordance with the instantaneous selection of the mechanism and means operable from the timing mechanism for terminating the transmitted impulse.

19. A device of the character described comprising, in combination, a timing mechanism, means responsive to a received impulse for starting said timing mechanism at the beginning of each received impulse, a selecting means, means to render said selecting means effective a predetermined time after the commencement of the signal impulse, and means operated by the timing mechanism, and controlled by the selecting mechanism for transmitting a signal impulse.

Signed at Croydon, in the county of Surrey, England, this twenty-third day of October, 1924.

FREDERICK GEORGE CREED.